United States Patent
Dean

(10) Patent No.: US 6,868,998 B2
(45) Date of Patent: Mar. 22, 2005

(54) BIKE MOUNT

(75) Inventor: Gregory A. Dean, McKinleyville, CA (US)

(73) Assignee: Watermark PaddleSports, Inc., Arcata, CA (US)

(*) Notice: Subject to any disclaimer, the term of this patent is extended or adjusted under 35 U.S.C. 154(b) by 2 days.

(21) Appl. No.: 10/193,737

(22) Filed: Jul. 10, 2002

(65) Prior Publication Data

US 2003/0071097 A1 Apr. 17, 2003

Related U.S. Application Data

(60) Provisional application No. 60/304,485, filed on Jul. 10, 2001.

(51) Int. Cl.[7] ................................................ B60R 9/10
(52) U.S. Cl. ...................................... 224/324; 224/924
(58) Field of Search ................................ 224/533, 535, 224/924, 322, 323, 315, 41.12, 325, 41.32, 326, 42.12, 42.32, 309, 319, 324; 211/5, 20, 23

(56) References Cited

U.S. PATENT DOCUMENTS

| | | | |
|---|---|---|---|
| 3,116,836 A | | 1/1964 | McCauley |
| 3,581,962 A | | 6/1971 | Osborn |
| 3,843,001 A | * | 10/1974 | Willis .......................... 224/924 |
| 3,861,533 A | * | 1/1975 | Radek .......................... 211/20 |
| 4,046,297 A | * | 9/1977 | Bland .......................... 224/924 |
| 4,437,597 A | * | 3/1984 | Doyle .......................... 224/533 |
| 4,524,893 A | | 6/1985 | Cole |
| 4,702,401 A | | 10/1987 | Graber et al. |
| 5,435,475 A | | 7/1995 | Hudson et al. |
| 5,549,231 A | | 8/1996 | Fletcher et al. |
| 5,692,659 A | | 12/1997 | Reeves |
| 5,833,074 A | | 11/1998 | Phillips |
| 5,862,966 A | | 1/1999 | Mehls |
| 5,944,198 A | * | 8/1999 | Ihalainen ........................ 211/5 |
| 5,988,403 A | | 11/1999 | Robideau |
| 6,244,483 B1 | | 6/2001 | McLemore et al. |
| 6,460,743 B2 | * | 10/2002 | Edgerly et al. ............. 224/924 |
| 6,648,300 B2 | * | 11/2003 | Chamoun ................. 254/10 B |

* cited by examiner

Primary Examiner—Nathan J. Newhouse
(74) Attorney, Agent, or Firm—Kolisch Hartwell, P.C.

(57) ABSTRACT

A bike mount for securing a bicycle to a vehicle rack. The bike mount includes arms that pivot apart to receive a bicycle wheel and pivot together to cooperatively hold the bicycle wheel. The bike mount may be configured to include a lever that pivots the arms together as the bicycle is positioned on the vehicle rack.

21 Claims, 6 Drawing Sheets

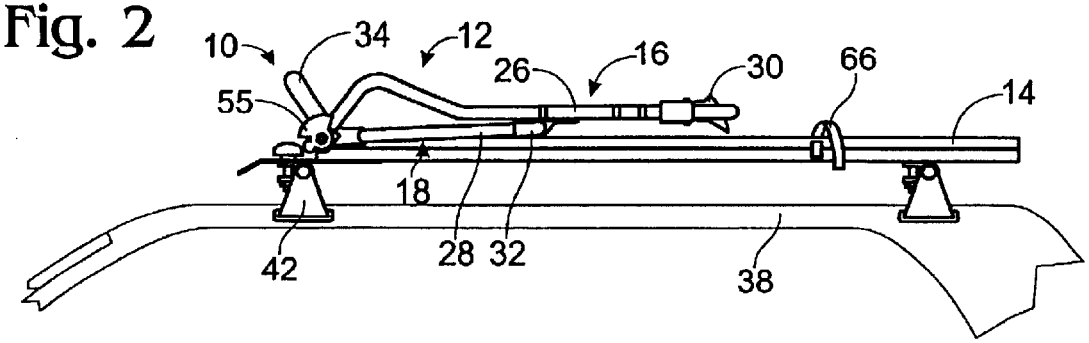
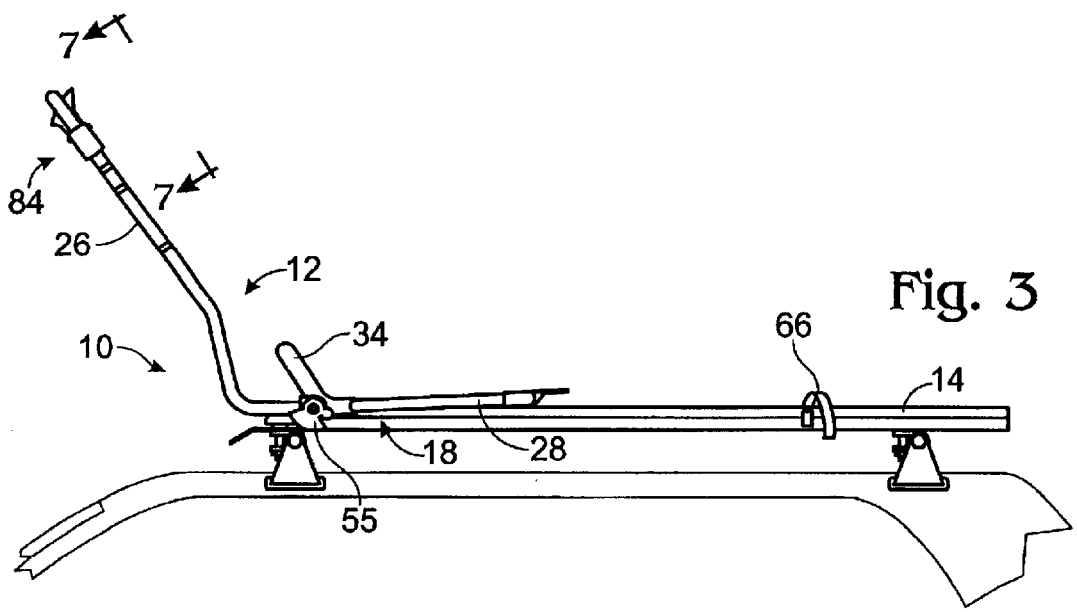
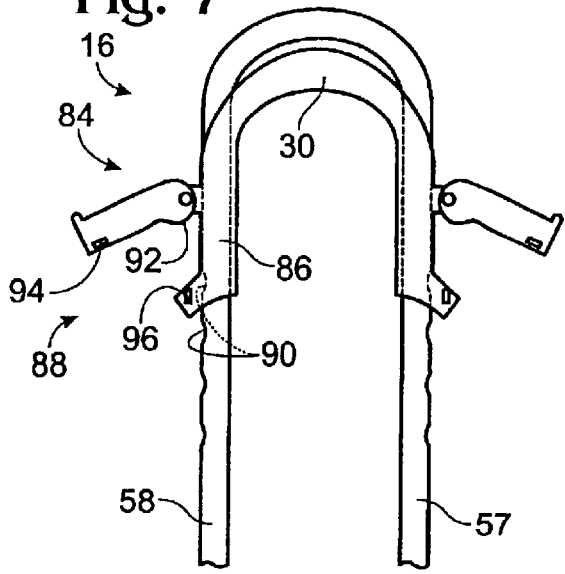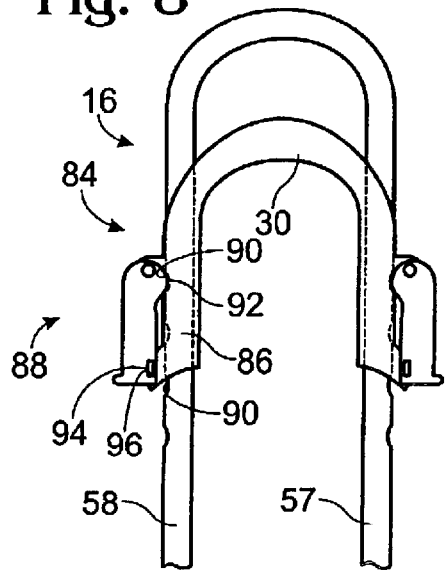

BIKE MOUNT

CROSS-REFERENCES

This application is based upon and claims priority under 35 U.S.C. §119 from U.S. Provisional Patent Application Ser. No. 60/304,485, filed Jul. 10, 2001, which is incorporated herein by reference in its entirety for all purposes.

FIELD OF THE INVENTION

The present invention is related to bike mounts. More specifically, the present invention is related to bike mounts that secure a bicycle to a vehicle rack.

BACKGROUND

The convenience of carrying bicycles on a vehicle rack has prompted the development of a number of approaches for attaching a bicycle to a carrier mounted on the vehicle rack. Generally, bicycles may be attached through their frames, their wheels, or a combination thereof. Frame attachment may effectively secure the bicycle to the vehicle rack. However, the rigidity of the bicycle frame may transfer potentially damaging motions from the vehicle to the bicycle. As result, the frame may be damaged structurally. In addition, points of carrier engagement on the frame may be damaged cosmetically, that is, dented or scratched. By contrast, wheel attachment overcomes some of these problems associated with frame attachment. Bicycle tires have an inherent shock-absorbing ability, generally reducing the effects of sudden vehicle motions on an attached bicycle.

Despite the advantages of wheel attachment, an effective bicycle carrier that relies on wheel attachment has not been described for use on a roof-mounted vehicle rack. For example, some wheel-based carriers do not grip a bicycle wheel tightly enough to safely carry a bicycle on a vehicle roof at high speeds. Other wheel-based carriers are not designed for easy bicycle loading on a vehicle roof. As a result, it may be difficult for one person to position and balance a bicycle on the carrier as the bicycle is attached.

Therefore, a vehicle-mounted bicycle carrier is needed that is easily loaded with a bicycle and that holds a wheel of the bicycle effectively.

SUMMARY OF THE INVENTION

A bike mount for securing a bicycle to a vehicle rack is provided. The bike mount includes arms that pivot apart to receive a bicycle wheel and pivot together to cooperatively hold the bicycle wheel. The bike mount may be configured to include a lever that pivots the arms together as the bicycle is positioned on the vehicle rack.

BRIEF DESCRIPTION OF THE DRAWINGS

FIG. 2 is a side elevation view of the bike mount of FIG. 1 in a stowed position.

FIG. 3 is a side elevation view of the bike mount of FIG. 1 in a bicycle-receiving position.

FIG. 7 is a top plan view of an adjustable wheel engagement mechanism on an arm of the bike mount of FIG. 1, shown in a slidable configuration viewed generally along line 7—7 of FIG. 3.

FIG. 8 is a top plan view of the wheel engagement mechanism of FIG. 7 in a fixed configuration.

DETAILED DESCRIPTION

The present invention provides a bike mount that may be attached to a vehicle rack and used to secure a bicycle to the rack. The bike mount includes first and second arms coupled to a rack support structure. The arms pivot apart to receive a bicycle wheel and pivot together to hold the wheel, for example, by gripping the wheel cooperatively with the arms. The wheel may be engaged by the bike mount, using the arms or the arms plus the rack support structure, at three or more spaced positions around the perimeter of the wheel to hold the wheel in place. In some embodiments, the bike mount may have a self-loading feature in which the second arm includes a lever. The lever is configured to pivot the second arm from a receiving position toward a retaining position when the received bicycle wheel (and bicycle) is pushed toward the first arm. Each of the arms may be locked in the retaining position to hold the wheel, to hold one arm in position as the arms are separated from the wheel, and/or as part of a security mechanism.

When the bicycle is received, engaged, and/or retained, another wheel of the bicycle may be supported by and secured to a support tray that is integral with or separate from the rack support structure and the arms. The support tray generally provides a spaced site for attachment of the bike mount to the vehicle rack.

Figure 1:
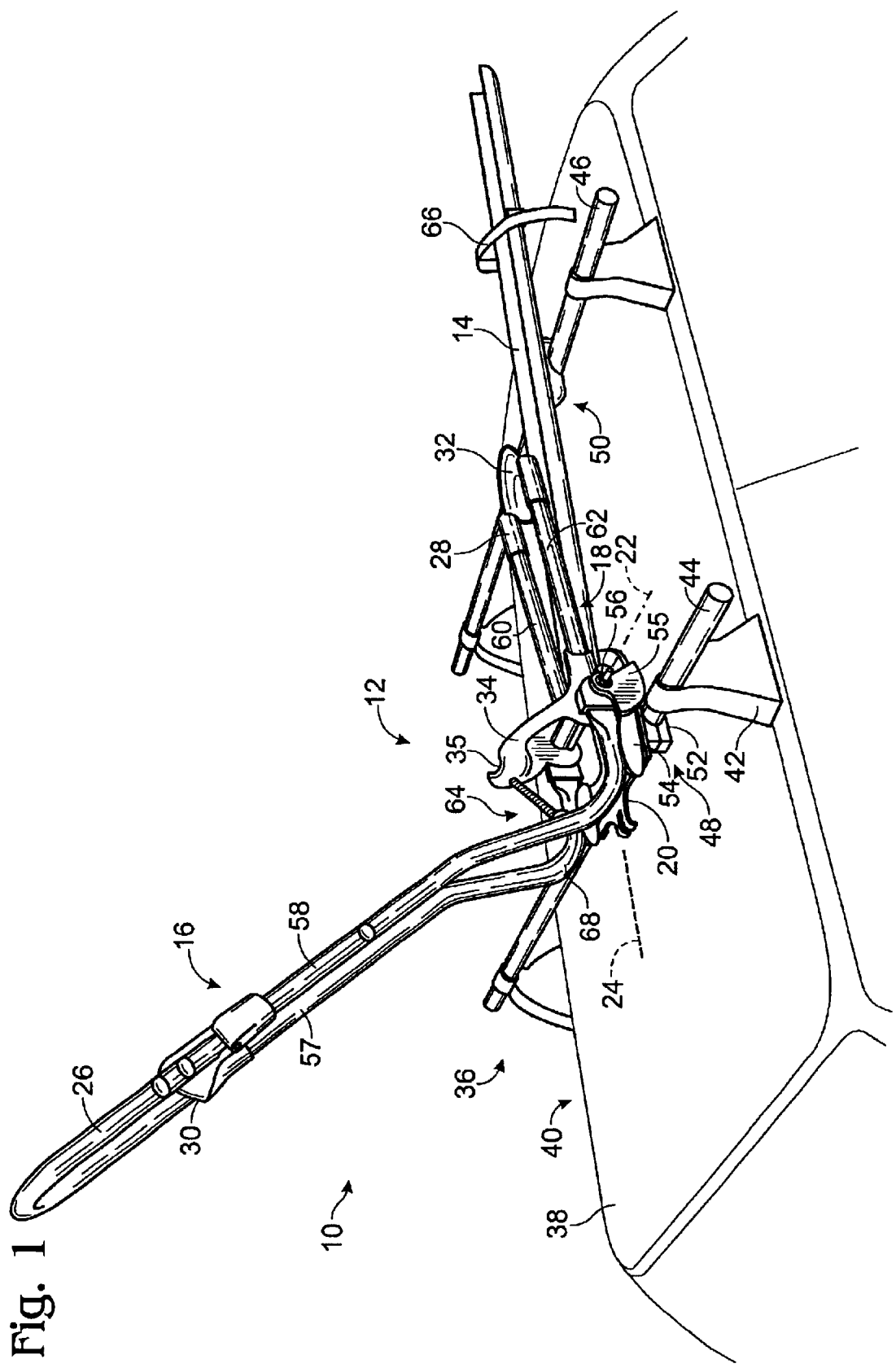
FIG. 1 is a perspective view of an embodiment of a bike mount attached to a vehicle rack on a vehicle, in accordance with aspects of the invention.

FIG. 1 shows an embodiment of a bike mount 10 constructed according to the invention. Bike mount 10 includes a clamp assembly 12 for holding one of the wheels of a bicycle, usually a front wheel, and a tray 14 that supports another wheel, usually a rear wheel of the bicycle.

The clamp assembly includes a first arm 16, a second arm 18, and a rack support structure or base 20. First arm 16 may be pivotably attached to rack support structure 20 at pivot axis 22, and second arm 18 is pivotably attached at pivot axis 22, or a second, generally parallel pivot axis. Alternatively, first arm 16 may be non-pivotable and thus may have a fixed angular position relative to long axis 24. First and second arms 16, 18 may include first and second arm members 26 and 28, respectively. Each arm also may include a wheel engagement structure 30 and 32, positioned in a spaced relation to pivot axis 22 on a distal portion of the arm. Second arm 18 also may include a lever 34 that is operably coupled to second arm member 28, for example, at or near pivot axis 22. Lever 34 may provide a third wheel engagement structure 35, generally disposed proximally on the arm, which is structured to support and engage a wheel of a bicycle. Rack support structure 20 may be coupled to tray 14, which may be aligned substantially orthogonally to pivot axis 22 and parallel to long axis 24.

Bike mount 10 may be attached to a vehicle rack 36 positioned above a roof 38 of a vehicle 40, or any other suitable vehicle surface, such as the bed of a truck. Vehicle rack 36 generally includes towers 42 that secure the carrier to vehicle 40 and crossbars 44 and 46. The crossbars are linked to towers 42, typically in a spaced relation to roof 38 and transverse to the long axis of vehicle 40. A bike mount may be secured to crossbars 44 and 46 through rack support structure 20 and tray 14.

Rack support structure 20 and tray 14 may include adjustable fastener mechanisms 48 and 50, respectively, which anchor bike mount 10 to vehicle rack 36. As shown here, each fastener mechanism may include at least one clamp 52 that grips a portion of a crossbar 44 or 46. A fastener assembly, such as a nut and bolt, may be used to secure clamp 52 to the crossbar. In bike mount 10, the nut, or alternatively, the head of the bolt, may be secured to or may include an enlarged gripping structure, such as fastener handle 54. Fastener handle 54 may control engagement of clamp 52 with crossbar 44, thus allowing adjustment of fastener mechanism 48 without gripping tools. As will be described in detail later, rotation of handle 54 may be blocked by the position of a pivotable retainer 55 on hub 56 of first arm 16.

Arm members 26 and 28 may have any suitable structure. As shown in FIG. 1, first arm member 26 and second arm member 28 may have an extended arch-like structure, referred to as a hoop. Here, pairs of spaced supports 57 and 58, 60 and 62, extend generally normal to pivot axis 22 and may flank a received, engaged, and/or retained bicycle wheel laterally to the wheel. A hoop may be formed as a single component, such as first arm member 26, where supports are formed from a single piece of tubular material. Alternatively, as shown for second arm member 28, supports may be discrete components that are joined by a separate component, such as wheel engagement structure 32, or may be joined directly to each other. In other embodiments, first and second arm members may have any suitable structure that allows them to position wheel engagement structures 30 and 32 distally from rack support structure 20 and/or pivot axis 22. For example, each arm member 26 and/or 28 may include only one support that extends generally normally to pivot axis 22 and is joined to a wheel engagement structure at the distal portion of the arm member. Suitable materials for the arm members may include, but are not limited to, a sturdy, lightweight material such as aluminum or other metal alloy, a plastic, or a combination thereof.

Wheel engagement structures 30 and 32 may have any structure that can hold a peripheral portion of a wheel, usually by contact with the tire portion of the wheel. Wheel engagement structures may provide a concave surface that is at least partially complementary to a perimetrical transverse section of a bicycle wheel. For example, each wheel engagement structure may have an arcuate configuration with a radius large enough to accommodate a bicycle tire, such as shown in FIG. 7. Other configurations may be suitable, such as an angular surface, for example, a pointed arch. As described more fully below, each wheel engagement structure 30, 32 may have a fixed position along the long axis of an arm 16 or 18, or may have an adjustable position. The long axis of each arm is defined by each arm member, 26 or 28.

Lever 34 is any structure that is operably coupled to second arm 18 to pivot the second arm toward first arm 16 as a bicycle wheel is rolled against the lever, generally toward the first arm. For example, lever 34 may extend at a fixed angle relative to second arm member 28, generally normal to pivot axis 22. The lever may contact and support a lower portion of the bicycle wheel when the wheel is received, and/or may support and engage the wheel when it is held by the first and second arms 16, 18. In some embodiments, lever 34 may provide a site for attaching an arm locking mechanism 64, as described below.

Rack support structure 20 is any structure or assembly that couples arms 16 and 18 to vehicle rack 36. Accordingly, rack support structure 20 at least partially defines spatial positions of arms 16 and 18 relative to the vehicle rack and/or vehicle. In bike mount 10, rack support structure is a platform that attaches to crossbar 44 and carries first and second arms 16, 18. Alternatively, the rack support structure may include separate components that individually couple each arm to crossbar 44 (or 46) or to any other suitable portion of vehicle rack 36.

Tray 14 is any structure or assembly capable of supporting and positioning a second wheel of a bicycle when clamp assembly 12 grips the first wheel. As shown in FIG. 1, tray 14 may be a channel with a bottom portion that supports a wheel of a bicycle and sidewalls that limit transverse movement of the wheel. An end portion of tray 14 may be attached directly to clamp assembly 12, such as through rack support structure 20, and another portion may be attached to crossbar 46. This configuration attaches bike mount 10 at two spaced positions on separate crossbars and may help prevent unwanted rotation of bike mount 10 about the long axis of each crossbar. Alternative forms of a tray may be suitable. For example, the tray may substantially shorter than tray 14 of FIG. 1 and thus may be attached to crossbar 46, but not directly coupled to clamp assembly 12. Tray 14 may also include a wheel retainer 66, such as the strap shown in FIG. 1, to secure the second wheel of the bicycle to the bike mount.

Stowed and Receiving Positions

Bike mount 10 may be configured to include distinct stowed and receiving positions; see FIGS. 2, 3, 11 and 12. The stowed (or storage) position places both arms in a generally horizontal position, and thus may be suitable for carrying bike mount 10 on vehicle rack 36 without a bicycle. The receiving (or loading) position spaces distal portions of arms 16 and 18, usually by pivoting apart, to ready the arms (and wheel engagement structures 30, 32) for receiving a bicycle wheel. As used throughout, arms (and wheel engagement structures) are pivoted apart or away from each other when the smallest angle defined by the long axes of the arms increases, and are pivoted together or toward each other when the smallest angle decreases. Such pivotal movement is movement of the arms relative to each other, and thus may involve pivoting each of the arms or only one of the two arms relative the rack support structure.

FIG. 2 shows a stowed position for bike mount 10. In this position, first arm 16 has been pivoted toward second arm 18 so that the first and second arms are aligned and disposed in a generally horizontal position on tray 14. The stowed position is a configuration that only may be achieved by first arm 16 when the first arm is configured to be pivotable.

Figure 11:
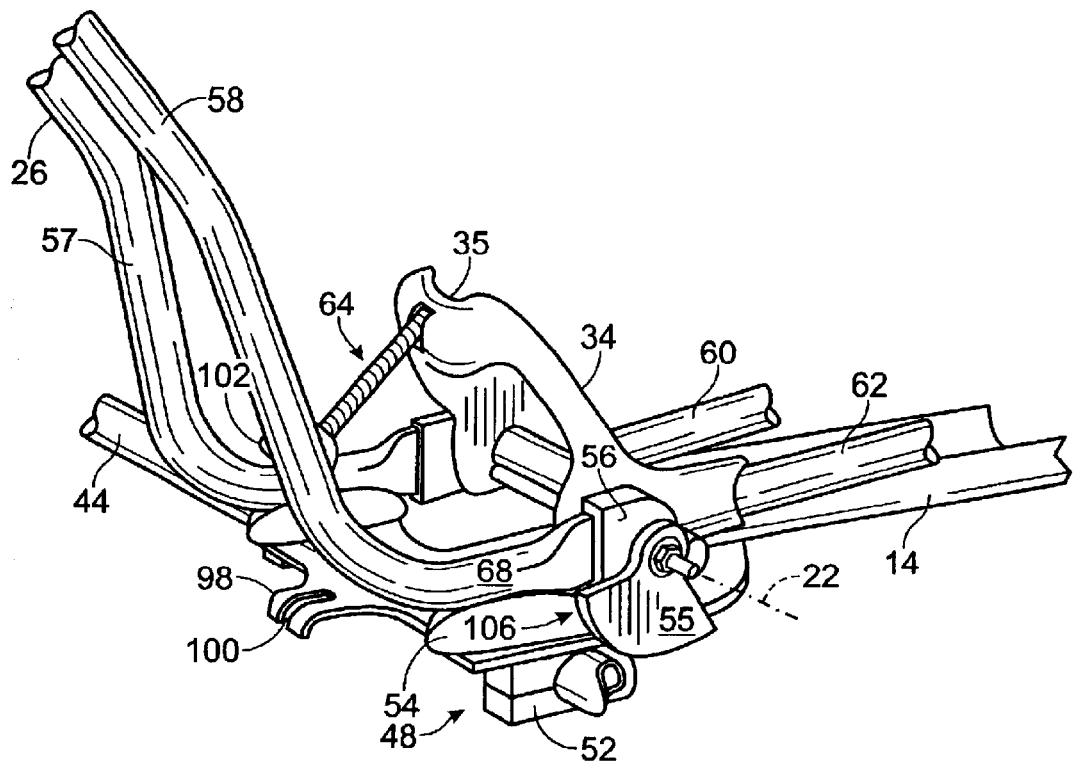
FIG. 11 is a fragmentary perspective view of the bike mount of FIG. 1 in a bicycle-receiving position.

FIGS. 2, 3, 11 and 12 provide a comparison of a stowed position and a receiving (or loading) position. In FIGS. 3 and 11, relative to FIGS. 2 and 12, first arm 16 has been pivoted away from second arm 18, through an angle of about 120 degrees. This places the first arm in a receiving position, which may function also as an enaged (and/or retaining) position (see below). A pivotable first arm may be pivotable through any suitable angle, or an angle of about 90 degrees to 160 degrees, about 105 degrees to 150 degrees, or about 110 degrees to 140 degrees relative to the stowed position. To enable first arm 16 to pivot past second arm 18, particularly lever 34, first arm member 26 may have a widened proximal portion 68 adjacent the pivot axis (see FIGS. 1 and 11).

Figure 12:
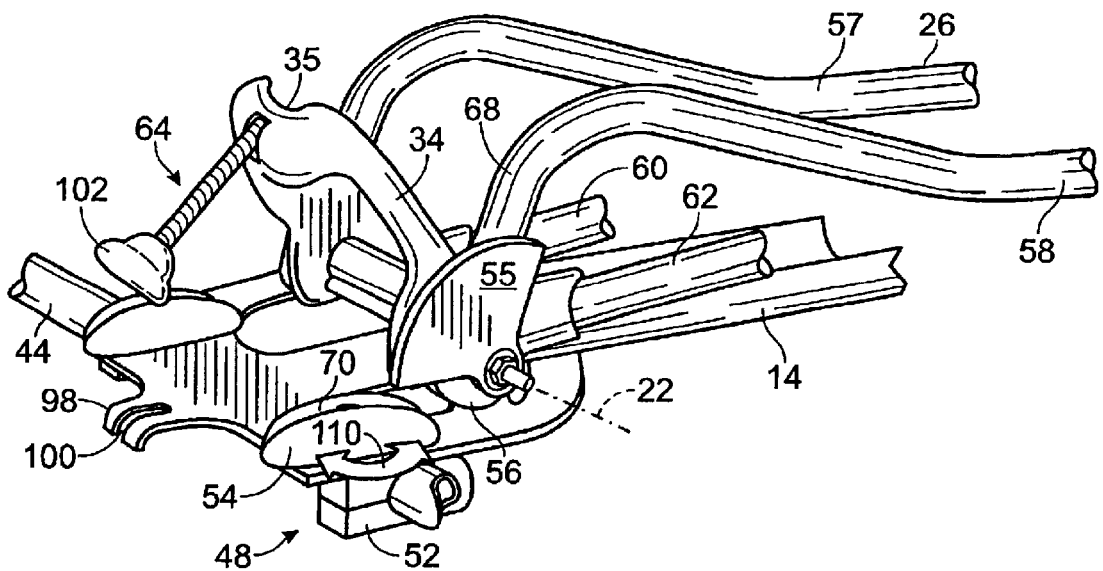
FIG. 12 is a fragmentary perspective view of the bike mount of FIG. 11 in a stowed position.

A receiving position of first arm 16 may be produced when pivotal movement of first arm 16 is blocked. In bike mount 10, pivotal movement of first arm 16 is blocked by contact of proximal portion 68 of first arm member 26 with a pivot stop on base 20. The contact prohibits further pivotal movement away from second arm 18. In this example, the pivot stop is provided by fastener handle 54, as shown in FIGS. 11 and 12. The pivot stop may include a contour 70 that is at least partially complementary to proximal portion 68. For example, handle 54 may have a concave top structure or groove. In other embodiments, first arm 16 may be prevented from pivoting away from second arm 18 or prohibited from pivoting in both directions by any suitable arm locking mechanism, such as arm locking mechanism 64 of second arm 18 (see below). The arm locking mechanism may be user implemented, adjustable, and/or the like.

Bicycle Loading and Retention

Figure 4:
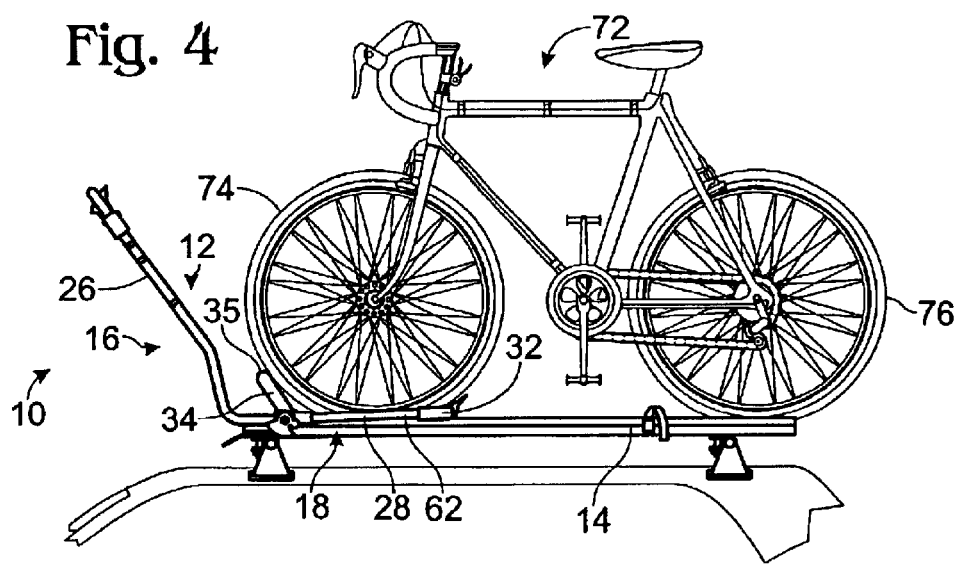
FIG. 4 is a side elevation view of the bike mount of FIG. 1 supporting a bicycle in the bicycle-receiving position of FIG. 3.
Figure 5:
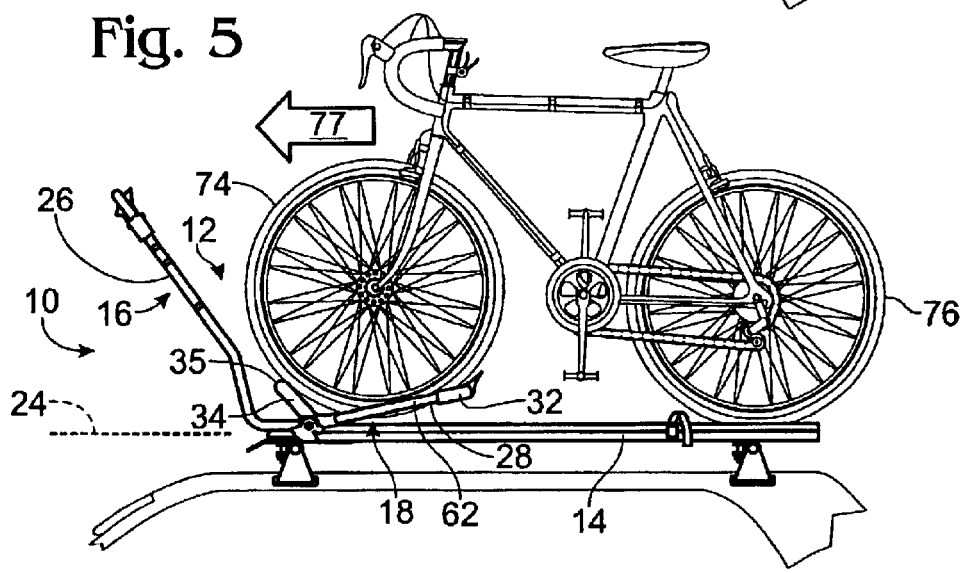
FIG. 5 is a side elevation view of the bicycle and bike mount of FIG. 4 with the bicycle in an intermediate position during loading on the bike mount, showing an arm of the mount pivoted out of the bicycle-receiving position.
Figure 6:
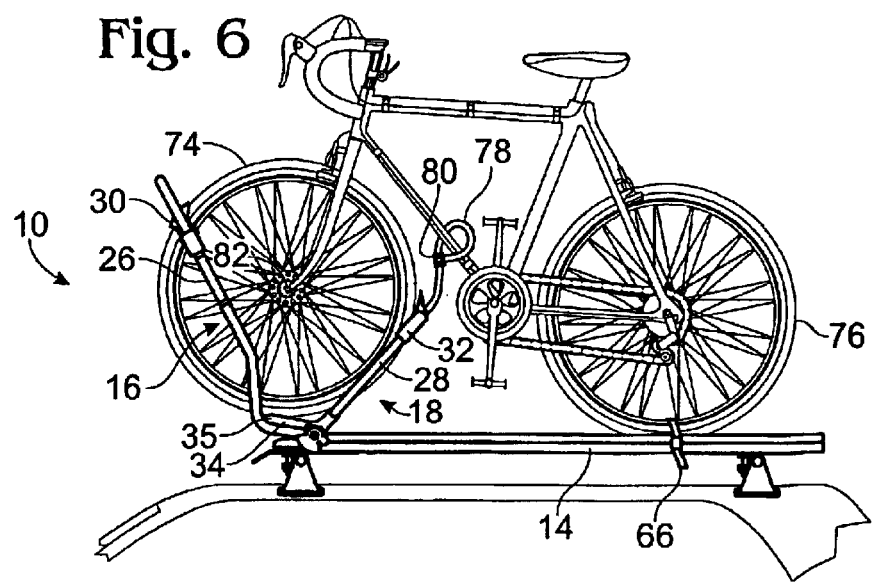
FIG. 6 is a side elevation view of the bicycle and bike mount of FIG. 4, showing the bike mount engaged with a wheel of the bicycle and locked to the frame of the bicycle.

FIGS. 4–6 illustrate loading and retaining a bicycle 72 on vehicle rack 36 using bike mount 10. In this example, clamp assembly 12 engages and retains front wheel 74, and rear wheel 76 is supported by tray 14. However, the bike mount may also be configured and used so that the clamp assembly secures and/or engages rear wheel 76 and the tray supports front wheel 74.

FIG. 4 shows a bicycle positioned at the outset of loading. A user disposes bicycle 72 so that second arm 18 supports front wheel 74 and rear wheel 76 rests on tray 14. Tray 14 plays an optional role in this loading position. When bicycle 72 is supported in this receiving position, front wheel 74 may contact lever 34 and wheel engagement structures 32 and 35, although at least one of these contacts may be replaced by contact with the tray or rack support structure. Wheel 74 may be flanked by supports 60 and 62.

FIGS. 5 and 6 show bicycle 72 at an intermediate loading position and an engaged (and/or retaining) position, respectively, during and after movement of the bicycle along arrow 77 toward first arm 16, generally parallel to long axis 24. As bicycle 72 is pushed forward, front wheel 74 pushes against lever 34 to pivot second arm 18 toward first arm 16, counterclockwise in this view. This pivotal movement results in second arm 18 rotating away from a generally horizontal receiving position. When motion of bicycle 72 shifts the force distribution between lever 34 and wheel engagement structure 32 sufficiently, an over-center action uses the weight of bicycle 72 to pivot second arm toward, and often fully into, the retaining position of FIG. 6. In the retaining position, wheel engagement structures 30, 32 may concurrently contact wheel 74. Depending on the particular wheel size, position of the first arm, position of wheel engagement structure 30, and/or the like, the lever may pivot the second arm into full engagement as in FIG. 6, or into near engagement. With near engagement, further adjustment of arms 16, 18 and/or wheel-engagement structures 30, 32 may be desirable, for example, as described below. In the engaged position, further pivotal movement of the second arm toward the first arm may be blocked by wheel 74 pushing against wheel engagement structure 30 on first arm 16. In addition, pivotal movement of the second arm away from the first arm may be impeded by the weight of the bicycle holding the lever in position. Accordingly, the bicycle may be engaged by both wheel engagement structures 30, 32, although not yet secured for vehicle travel, so that a person loading the bicycle may release the bicycle without it falling over. The person then may lock second arm 18 in position and/or may adjust the second arm to pivot slightly toward or away from the first arm, for example, to adjust engagement with wheel 74, as detailed below. Wheel retainer 66 also may be implemented to secure rear wheel 76.

Security against theft of the mounted bicycle may be provided by a security mechanism. For example, FIG. 6 shows second arm 18 with a cable 78 joined to a lock 80. The cable and lock may be configured to lock second arm 18 to the frame of bicycle 72 so that pivotal movement of second arm 18 out of the engaged position is prevented.

In the engaged (and retaining) position shown in FIG. 6, clamp assembly 12 engages front wheel 74 at three (or more) positions around the perimeter of wheel 74. A bottom portion of wheel 74 is supported and engaged by engagement structure 35 of lever 34, and middle or upper portions of wheel 74 are engaged by structures 30 and 32. The three positions of engagement may form a triangle that surrounds axle 82 of wheel 74. The smallest angle of the triangle may be about 30 degrees, about 40 degrees, or about 50 degrees.

Adjustable Wheel Engagement Structure

An embodiment of a bike mount may include a positionally adjustable wheel engagement mechanism on at least one of the first or second arm, 16 or 18. The adjustable mechanism may allow the wheel engagement structure to move between plural fixed positions along the long axis of the first or second arm 16, 18. The fixed positions may be predefined or continuous.

FIGS. 7 and 8 illustrate an embodiment of an adjustable wheel engagement mechanism 84 that is positionable to predefined positions along the long axis of first arm 16. Mechanism 84 generally includes wheel engagement structure 30, guide portions 86 connected to structure 30, and position lock 88 on at least one guide portion 86. A person may slidably position structure 30 using portions 86, which may provide a collar-like engagement with supports 57 and 58.

Positioning elements 90 on supports 57 and/or 58 may provide predefined positions at which engagement structure 30 may be fixed along the long axis of arm 16. Four positioning elements on each support are shown here. Each positioning element 90 may be engaged by a complementary structure 92 in position lock 88. As shown in FIGS. 7 and 8, each positioning element 90 may be a recess or hole on support 57 or 58. Structure 92 may be pivoted into contact with element 90, as shown by comparing the slidable position of FIG. 7 with the fixed position of FIG. 8. In the fixed position, complementary structures 94 and 96, in this case a tab and a slot, may snap together to maintain the fixed position. In alternative embodiments, position lock 88 may be provided by any mechanism that fixes the position of wheel engagement structure 30 along the long axis of first arm 16. For example, position lock 88 may include a bolt and nut that are fastened through a hole or to a surface of support 57 or 58. In some embodiments, element 90 may be omitted or may be a positional mark on support 57 and/or 58.

Elements 90 may be disposed so that wheel engagement structure 30 is positioned to effectively engage and retain different standard wheel sizes. Generally, elements 90 position wheel engagement structure 30 so that the structure engages a wheel at an angle of approximately 15 degrees to 60 degrees, about 20 degrees to about 50 degrees, or about 25 degrees to about 35 degrees relative to a line extending between pivot axis 22 and the rotational axis 82 of the engaged wheel, where the pivot axis is the vertex of the angle. For example, elements 90 may be located to properly position structure 30 for efficient engagement of wheels of diameters such as 20", 24", 26", 700c, and 29"/large downhill.

Arm Locking Mechanism

An engaged or nearly engaged position of bike mount 10, such as shown in FIG. 6, may be fixed and further adjusted with an arm locking mechanism to provide a retaining position for holding the bicycle on a vehicle. The retaining position is any arm configuration in which the arms are fixed in position around a wheel to prohibit separation of the wheel from the arms during normal operation of the vehicle. Thus the wheel is held and secured. An arm locking mechanism is any mechanism that fixes the angular position of one of the arms relative to the other arm. The arm locking mechanism may be implemented volitionally, that is, as desired by the user. The arm locking mechanism may prohibit an arm from pivoting in both pivotal directions or in only one direction. When only one pivotal direction is prohibited, the wheel (and the other arm) may prohibit pivotal movement in the other direction.

Figure 9:
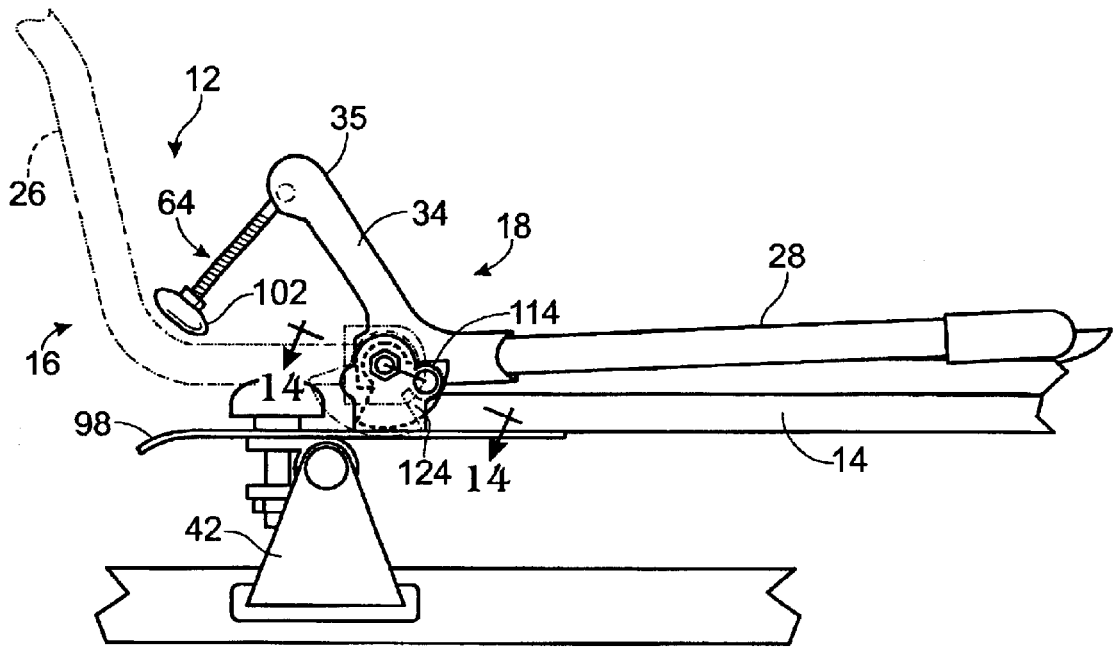
FIG. 9 is a fragmentary side elevation view of the bike mount of FIG. 1, illustrating an arm locking mechanism prior to use.
Figure 10:
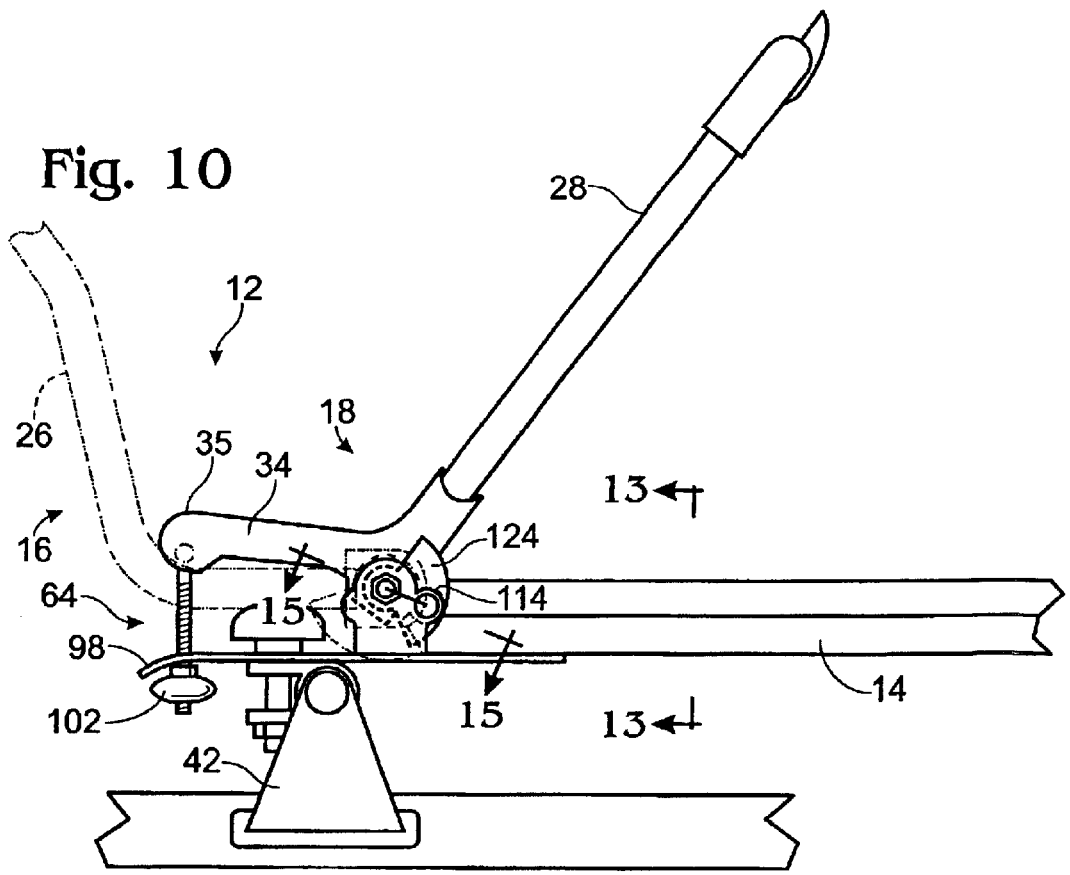
FIG. 10 is a fragmentary side elevation view of the bike mount of FIG. 9 in a wheel-retaining position and with the arm locking mechanism deployed.

FIG. 10 shows an embodiment of an arm locking mechanism, mechanism 64, in a locked configuration, prohibiting pivotal movement of second arm 18 in one pivotal direction. Arm locking mechanism 64 is further illustrated in FIGS. 9, 11, and 12 in an unlocked configuration. In both FIGS. 9 and 10, first arm 16 is shown in dotted outline to facilitate understanding the arm locking mechanism. Arm locking mechanism 64 may be attached to lever 34 at a portion of the lever that is distal to pivot axis 22, and attached to a retention structure on bike mount 10, such as flange 98. As illustrated in FIGS. 11 and 12, flange 98 may include a notched acceptor structure 100 into which a threaded fastener 102 may be placed and secured. When second arm 18 is pivoted into the engaged position, as shown in FIG. 10, fastener assembly 102 may be placed in acceptor structure 100, with a nut of the assembly positioned below flange 98 (see FIG. 12). The nut of fastener assembly 102 may then be rotated, in this case by hand, so that it contacts structure 98, and then further rotated to adjust the angular position of second arm 18. This angular adjustment of arm 18 may be useful to regulate a gripping pressure exerted on wheel 74 by clamp assembly 12.

Passive Security Mechanism

FIGS. 11 and 12 illustrate a passive security mechanism 106 that may be included in a bike mount. Security mechanism 106 is configured to prevent bike mount 10 from being removed from crossbar 44 when the arms holding a wheel. Mechanism 106 is described as passive because the mechanism does not require a separate locking action that is distinct from the actions carried out by a person in retaining a bicycle wheel with the bike mount.

Passive security mechanism 106 may include a pivot-dependent retainer, such as pivotable retainer 55, which is coupled to either first or second arm 16 or 18, usually near pivot axis 22. In the example of bike mount 10, pivotable retainer 55 is included in first arm 16 and positioned near proximal portion 68, as part of first arm hub 56. Pivotable retainer 55 has a restrictive and a permissive position. In the restrictive position, illustrated in FIG. 11 with first arm 16 in the loading (or engaged) position, pivotable retainer 55 is disposed in the pivotal path of fastener handle 54 and thus obstructs pivotal movement of the handle. In this restrictive position, fastener handle 54 cannot be pivoted a complete revolution and thus clamp 52 cannot be removed easily. By contrast, when first arm 16 is in the stowed position shown in FIG. 12, retainer 55 has pivoted to a permissive position that allows full pivotal movement of handle 54, as shown by arrow 110. Security mechanism may be based on the pivotal position of the first arm or the second arm.

First-arm Retaining Mechanism

Figure 13:
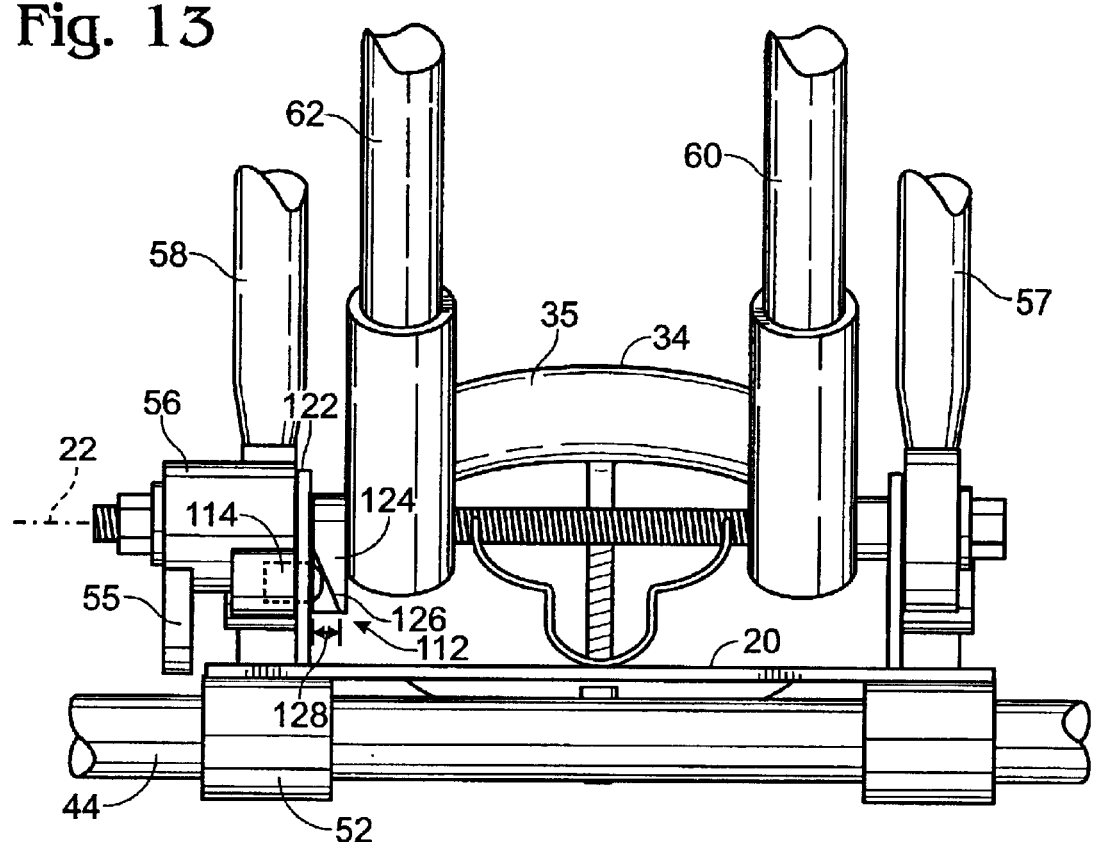
FIG. 13 is a fragmentary rear elevation view of the bike mount of FIG. 10, showing an arm retaining mechanism in a locked configuration.
Figure 14:
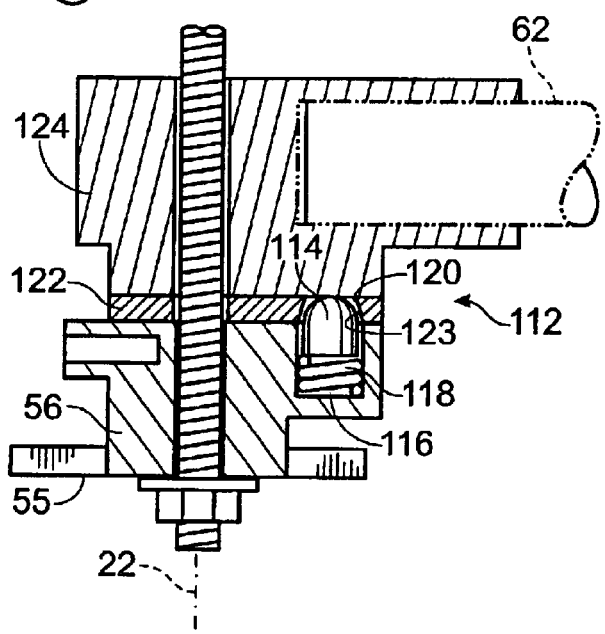
FIG. 14 is a fragmentary sectional view of the bike mount of FIG. 9, viewed generally along line 14—14 of FIG. 9, illustrating the arm retaining mechanism in an aligned, but unlocked configuration.
Figure 15:
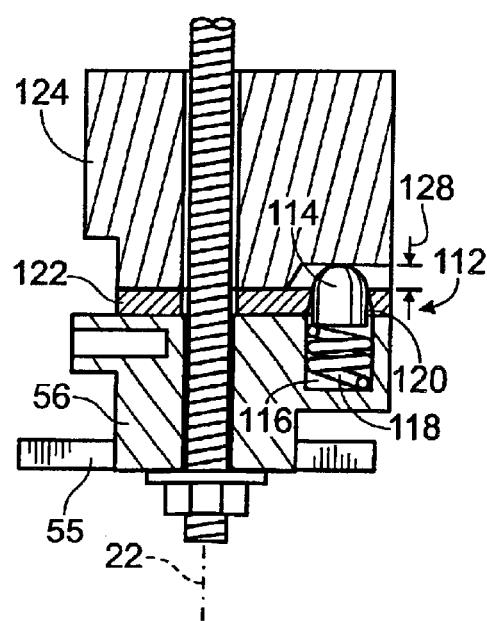
FIG. 15 is a fragmentary sectional view of the bike mount of FIG. 10, viewed generally along line 15—15 of FIG. 10, further illustrating the arm retaining mechanism of FIG. 13 in a locked configuration.

Bike mount 10 may include a first-arm retaining mechanism 112 shown in FIGS. 13–15. These illustrations are related to FIGS. 9 and 10, but now show portions of the first arm in solid rather than dashed lines to better illustrate the retaining mechanism. The first-arm retaining mechanism provides a lock that fixes the first arm in the loading (engaged) position, but fixing is regulated by the pivotal position of each arm.

The first-arm retaining mechanism may have the following properties. First, the mechanism may function when the first arm is in the loading/engaged position, but not when the first arm has been rotated away from the loading/engaged position. Second, when the first arm is in the loading/engaged position, the second arm permits the lock to function when the second arm is in the engaged position, but not when the second arm is in the loading position. The retaining mechanism may be useful when a bicycle is moved from the engaged position to the receiving (in this case unloading) position. Specifically, the engaged wheel may tend to remain associated with the first arm as the bicycle is moved to the unloading position. The arm retaining mechanism may act to temporarily hold the first arm in position, thus properly disengaging the wheel from the first arm as the second arm pivots away from the first arm. The retaining mechanism also may facilitate holding the wheel in position during engagement, and may restrict further the ability of a thief to overcome the passive security mechanism described above. The arm retaining mechanism described here also may be useful in locking the second arm in position based on the pivotal position of each arm.

FIGS. 13–15 show the structure and operation of the first-arm retaining mechanism 112. Mechanism 112 includes a biased displaceable member such as pin 114, movably positioned within a recess 116 of first arm hub 56. Pin 114 is coupled to a spring 118 at its base to bias the position of the member towards an extended configuration, as shown in FIGS. 13 and 15. When first arm 16 is in the loading/engaged position of FIGS. 1, 3 and 9, biased pin 114 is aligned with a through-hole 120 positioned in extension 122 of rack support structure 20. As shown in FIG. 14, through-hole 120 may have beveled edges 123 that diverge toward first arm hub 56. In this locked configuration, attempted movement of the first arm will be blocked by contact of pin 114 with base extension 122. Rather than a biased pin, another biased displaceable member may be suitable, such as a leaf spring.

As shown in FIG. 13, the second arm includes a second arm hub 124 with a beveled profile 126 on a side portion. The beveled profile determines the axial position of the biased pin as the second arm is pivoted, using an axial cam mechanism. Therefore, the gap 128 between the beveled profile and the base extension, at the position of the through-hole, varies according to the pivotal position of the second arm. In the engaged position shown in FIGS. 13 and 15, locking gap 128 is provided by the beveled profile. In contrast, pivotal movement of the second arm to the loading/unloading position significantly reduces the gap so that a rounded portion of pin 114 contacts beveled edge 123. In this position, a ramping action of the beveled surface relative to the rounded portion of the pin further displaces pin 114 to allow rotation of the pin out of alignment with through-hole 120. This is illustrated by comparing FIGS. 14 and 15. A role for the pivotal position of the second arm in the locking mechanism is also illustrated by comparing FIGS. 14 and 15. It should be noted that support 62 of second arm 28 is included in FIG. 14, in outline, to illustrate pivotal movement of second arm hub 124 relative to its position in FIG. 15. Support 62 would not normally be visible in the indicated view.

The specific embodiments disclosed and illustrated herein should not be considered as limiting the scope of the invention, as understood by a person having ordinary skill in the art. Numerous variations are possible without falling outside the scope of the appended claims. The subject matter of the invention includes all novel and nonobvious combinations and subcombinations of the various elements, features, functions, and/or properties disclosed herein.

I claim:

1. An apparatus for carrying a bicycle on a vehicle rack, comprising:
   a rack support structure configured to be connected to the vehicle rack;
   first and second arms coupled to the rack support structure, the second arm being pivotable between a receiving position for receiving a bicycle wheel and a fixed retaining position in which the first arm and the second arm cooperatively engage a tire of the same bicycle wheel so that removal of the wheel from the first and second arms is prevented; and
   a lever operably coupled to the second arm, the lever being configured to pivot the second arm from the receiving position toward the retaining position, as the bicycle wheel is rolled against the lever and generally toward the first arm.

2. The apparatus of claim 1, the first arm being pivotally coupled to the rack support structure, the first arm having a pivotal position at which pivoting away from the wheel is prohibited.

3. The apparatus of claim 1, wherein the vehicle rack includes a crossbar, the rack support structure being configured to be attached to the crossbar.

4. The apparatus of claim 1, the first and second arms each having a proximal portion and a distal portion, the proximal portions coupling the arms to the rack support structure, the distal portions each being configured to engage the tire of the bicycle wheel.

5. The apparatus of claim 1, the second arm defining a pivot axis and a long axis, the lever extending generally orthogonally to the pivot axis at a fixed angle relative to the long axis.

6. The apparatus of claim 1, further comprising a detent mechanism, the detent mechanism being volitionally implementable to restrict the second arm from pivoting out of engagement with the wheel from the fixed retaining position.

7. The apparatus of claim 1, the apparatus being configured to have at least three spaced positions of engagement with the tire of the wheel when the first and second arms cooperatively engage the wheel.

8. An apparatus for carrying a bicycle on a vehicle rack, comprising:
   a rack support structure configured to be connected to the vehicle rack; and
   first and second arms pivotably coupled to the rack support structure to define pivot axes disposed at about the same vertical position, the first and second arms being configured to pivot apart to receive the same wheel of the bicycle and configured to pivot together to a fixed retaining position in which the first and second arms cooperatively engage a tire of the bicycle wheel so that removal of the wheel from the first and second arms is prevented.

9. The apparatus of claim 8, wherein the vehicle rack includes a crossbar, the rack support structure being configured to be attached to the crossbar.

10. The apparatus of claim 8, the first and second arms each having a proximal portion and a distal portion, the proximal portions pivotably coupling the arms to the rack support structure, the distal portions being configured to engage the tire at two or more spaced positions.

11. The apparatus of claim 8, further comprising a detent mechanism that prohibits the second arm from releasing the bicycle wheel.

12. The apparatus of claim 8, the first arm being pivotable between a stowed position and a wheel-receiving position, the wheel-receiving position being configured to prohibit the first arm from pivoting away from the wheel.

13. The apparatus of claim 8, the apparatus being configured to engage the bicycle wheel at three or more spaced positions around the tire of the bicycle wheel, at least two of the three or more spaced positions being defined by the first arm and the second arm.

14. The apparatus of claim 8, wherein the tire includes a bottom disposed at a lowest vertical position when engaged by the first and second arms, wherein each of the pivot axes is disposed at about the lowest vertical position.

15. The apparatus of claim 8, wherein the pivot axes are at least substantially the same axis.

16. An apparatus for carrying a bicycle on a vehicle rack, comprising:
   a rack support structure configured to be connected to the vehicle rack;
   first and second arms coupled to the rack support structure, the second arm being pivotable to a fixed retaining position in which the first and second arms cooperatively engage the same bicycle wheel;
   a lever coupled to the second arm and operable with the bicycle wheel to pivot the second arm toward the retaining position; and
   a detent mechanism coupled to the second arm via the lever, the detent mechanism being actuable to fix the second arm in the retaining position and being adjustable to determine how tightly the bicycle wheel is engaged by the first and second arms.

17. The apparatus of claim 16, wherein the first arm is pivotable between a storage position and a receiving position in which the bicycle wheel can be received between the first and second arms.

18. The apparatus of claim 16, wherein the second arm is pivotable about a pivot axis, and wherein the lever extends in a fixed relation to the second arm and transverse to the pivot axis.

19. The apparatus of claim 16, wherein the detent mechanism includes a detent member, and wherein rotation of the detent member is configured to adjust how tightly the bicycle wheel is engaged by the first and second arms.

20. The apparatus of claim 16, wherein the detent mechanism includes a flange and an elongate fastener, and wherein the flange includes an opening in which the elongate fastener is configured to be received.

21. The apparatus of claim 20, wherein the detent mechanism includes a nut configured to be received threadably on the elongate fastener so that the nut engages the flange.

* * * * *